March 14, 1939. J. F. FIELD 2,150,716
SEED CLEANING MACHINE
Filed Aug. 24, 1936 3 Sheets-Sheet 1
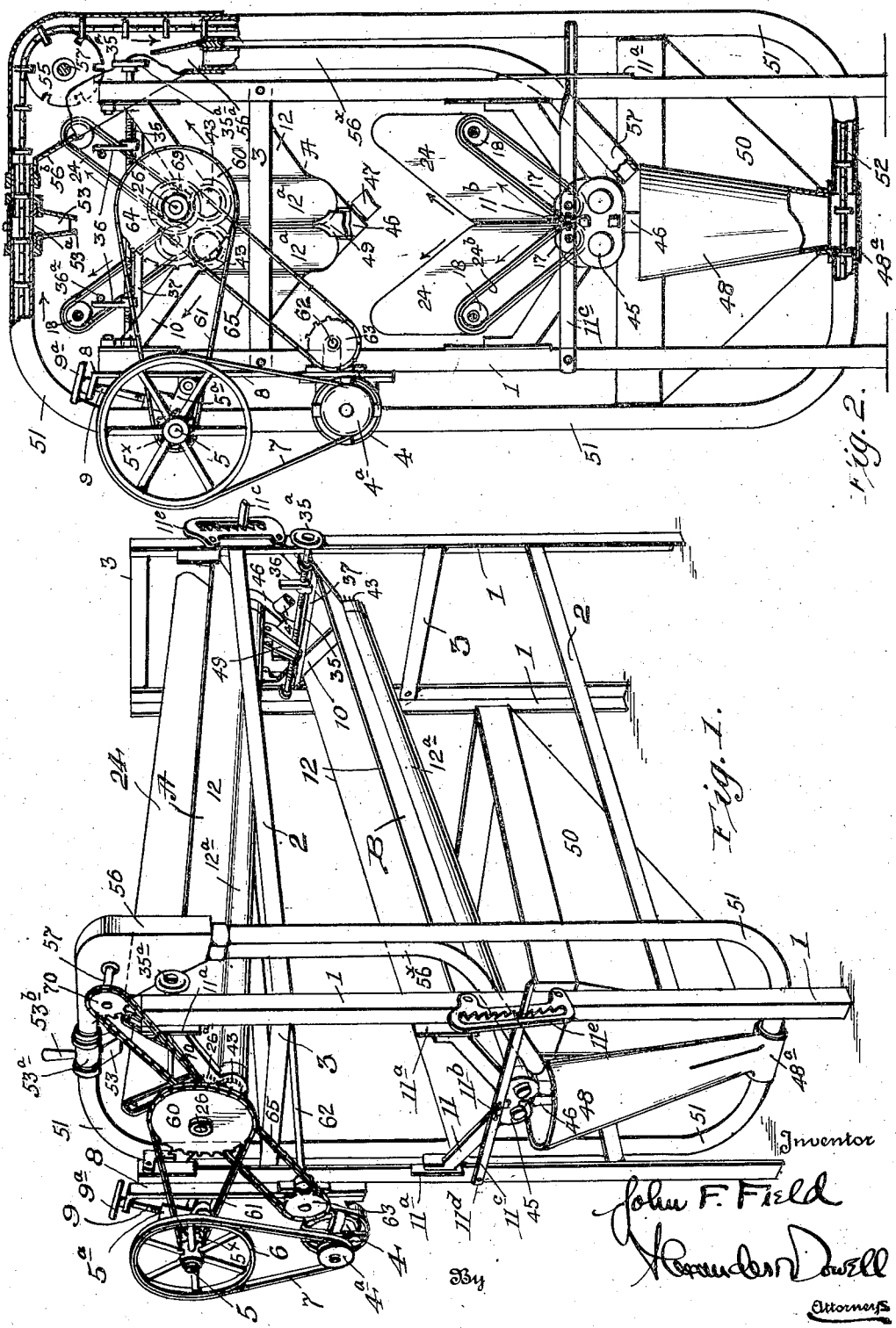

March 14, 1939. J. F. FIELD 2,150,716
SEED CLEANING MACHINE
Filed Aug. 24, 1936 3 Sheets-Sheet 2
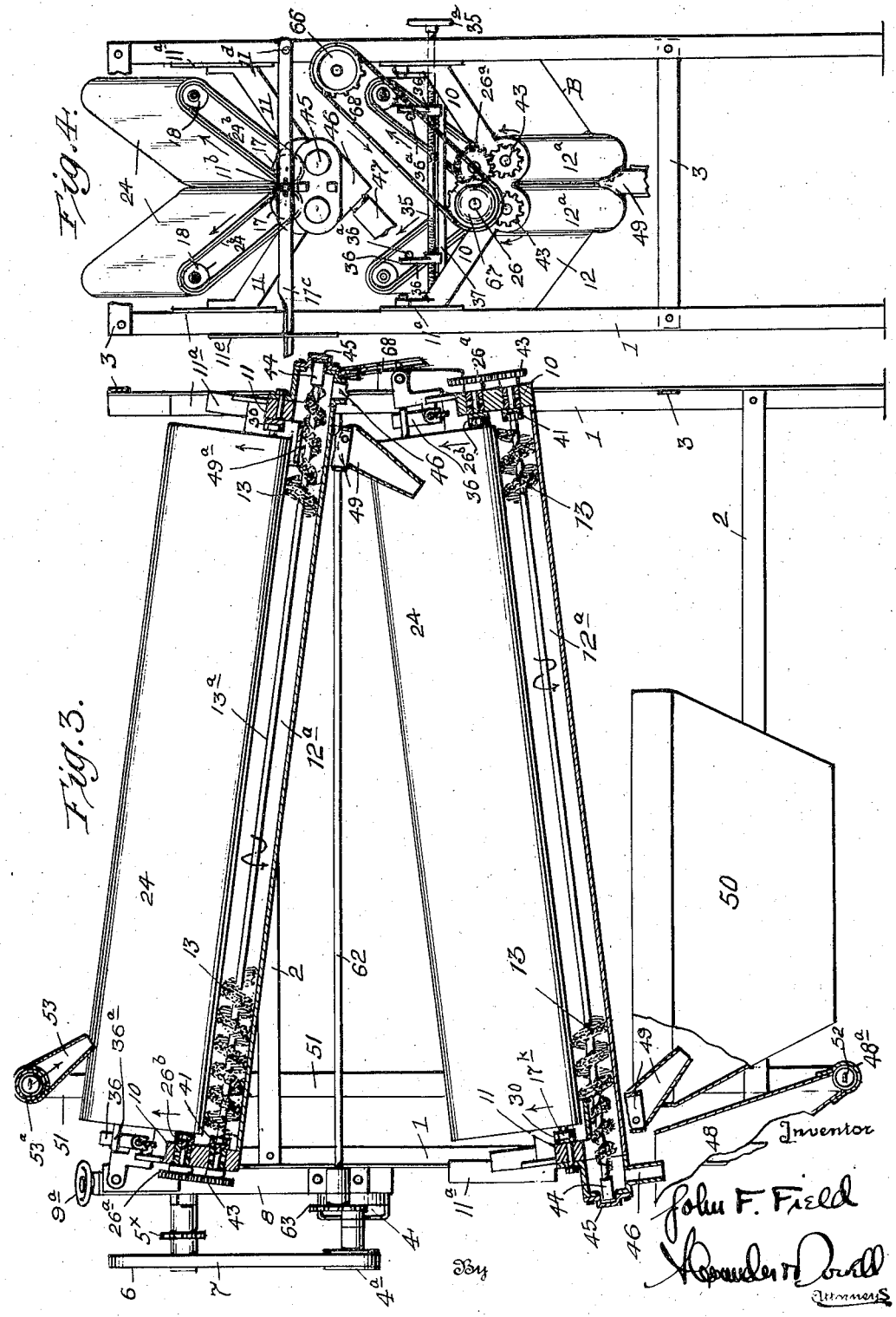

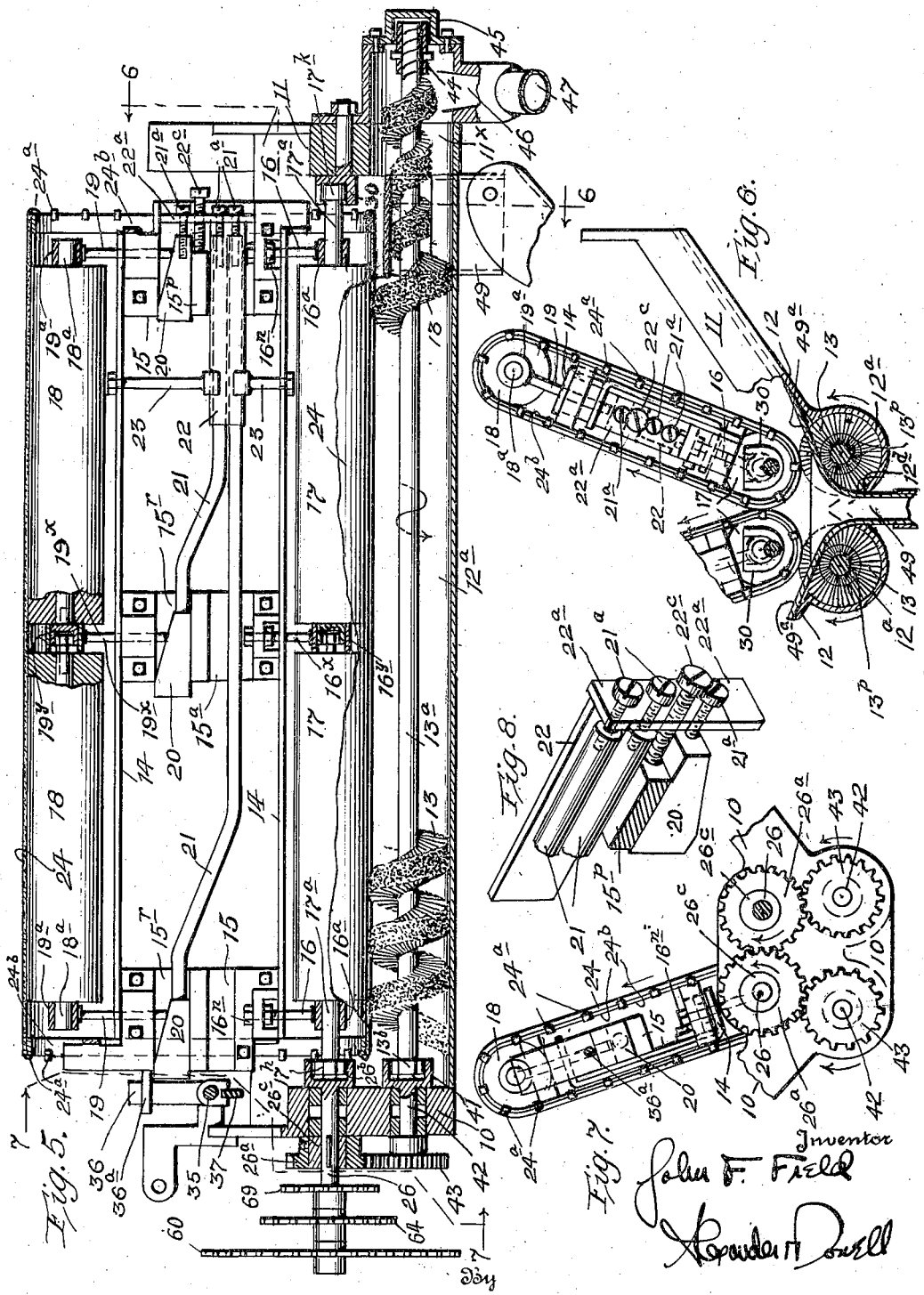

Patented Mar. 14, 1939

2,150,716

UNITED STATES PATENT OFFICE 2,150,716

SEED CLEANING MACHINE

John F. Field, Owosso, Mich.

Application August 24, 1936, Serial No. 97,717

18 Claims. (Cl. 209—114)

This invention is a novel machine for separating or culling weed seeds and other material from alfalfa, clover, or other grain seeds, said machine being an improvement upon that shown and described in my co-pending application Serial No. 710,949, filed February 12, 1934, and consisting of a frame carrying one or more downwardly inclined V-shaped seed troughs formed by opposed endless belts running over pairs of parallel rolls, the belts substantially touching at their lower ends, and the inner runs of the belts running upwardly and outwardly to carry the refuse, such as weed seeds and culls up over the tops of the belts and into collecting pans disposed below the troughs.

One object of the invention is to provide novel endless belt frame units so designed as to be readily removable from the machine without dismantling the same for the purpose of inspecting or replacing a worn or damaged belt.

Another object of the invention is to provide novel means for holding the belts of each unit taut so as to prevent them from creeping endwise on the rolls. Heretofore seed cleaners of the general type have not operated successfully, as the belts did not run true on the rolls. The diameters of the rolls are necessarily small, being limited to approximately 2 inches, while the length of these rolls must necessarily be from five to eight feet in order to accomplish the culling result. For practical purpose two inches is about the diametrical limit of the rolls for successful operation, for if the diameter is larger the seed must be lifted out of the bottom of the trough in a nearly perpendicular direction in order to reach the top of the inclined belts.

A set of rolls two inches in diameter and approximately six feet long, even if made from the most suitable material, will as a matter of fact be deflected when the belt is stretched taut between the rolls, so that the lowermost rolls which are in contact with each other do not contact throughout their entire lengths but only at their end portions. This deflection of the rolls has several adverse effects; first, if the lower rolls of each section which are placed together to form a V-shaped trough are deflected, the ends of the rolls may be set the proper distance apart while the middle of the rolls will be deflected enough to allow the smaller seeds to drop therethrough; and secondly, if a belt of a more or less pliable texture is used, the tension in each thread of the cloth accumulates so as to put sufficient strain on the parallel shafts of each set to deflect them towards each other, the greatest deflection being midway between the bearings of the rolls. This deflection creates a shorter periphery in the belt at the centers of the rolls than at their ends where the rolls are held by their bearings the proper distance apart, and the periphery of the belt is therefore greater at the ends of the rolls. This difference in periphery causes the middle of the belt to tend to revolve around the roll faster at its center than at its ends, thus distorting the belt and setting up a strain in the belt itself that soon destroys same; also causing the belt to draw inwardly from the ends of the rolls toward their middle portions according to the amount of deflection. I therefore provide tracks at the ends of the belts and parallel with the runs thereof, with hooks on the belts slidably engaging the tracks to prevent the ends of the belt from being drawn inwardly towards the middle, thereby maintaining the apron taut.

In my machine, in order to keep the rolls parallel, I journal the belt rolls in a separate readily removable frame carrying a series of bearings. The bearings for the lower driven roll are held stationary with the frame, while the bearings at the ends and centers of the upper roll are adjustable; and I provide individually or collectively adjustable wedge blocks for positioning the upper bearings in order to set up proper tension in the belt to cause it to revolve with the lower driven roll, and to carry the refuse, weed seeds or culls up over the top of the belt.

A still further object of the invention is to provide each endless belt with its individual spiral brush adapted to rotate in the same direction as the belt but at a somewhat greater speed, thereby effecting a strong brushing action on the nap of the belt, brushing the nap into such raised position that it will readily pick up the seed as the belt travels upwardly and outwardly through the seed in the trough. The brushes furthermore by reason of their spiral construction act as rotary conveyors to move the refuse accumulating in the pan to the refuse outlet.

A still further object is to provide means for adjusting the lower ends of the endless belt units of the V-shaped troughs towards or from each other so that the belts may be adjusted from ten to twenty thousandths of an inch apart thereby preventing the nap of the belts being flattened by contact with an opposed belt of the trough.

A still further object is to provide a novel feed hopper with an elevator for feeding a regulated amount of seed to be cleaned to the upper belt trough.

Other minor objects of the invention will be hereinafter set forth.

I will explain the invention with reference to the accompanying drawings which illustrate one practical embodiment thereof to enable others familiar with the art to adopt and use the same; and will summarize in the claims the novel features of construction, and novel combinations of parts, for which protection is desired.

In said drawings:

Fig. 1 is a perspective of the machine with the lower belt trough removed.

Fig. 2 is an enlarged end elevation of the machine showing the elevator partly in section.

Fig. 3 is an enlarged vertical section through the machine.

Fig. 4 is an elevation of the opposite end of the machine.

Fig. 5 is an enlarged plan view of one endless belt unit, and adjacent parts of the machine, showing the belt broken away to illustrate the belt tensioning devices; also showing the spiral rotary brush associated with the belt and the means for driving the belt and brush.

Fig. 6 is a section on the line 6—6, Fig. 5.

Fig. 7 is a section on the line 7—7, Fig. 5.

Fig. 8 is an enlarged detail perspective view.

The machine consists of a skeleton frame of general rectangular shape, consisting of corner uprights 1 connected by side bars 2, and end bars 3. Extending between the ends of the frame are V-shaped pans A and B (Fig. 1) disposed one above the other, each pan comprising V-shaped end castings 10 and 11 to which the pan plates 12 are secured. In Fig. 1 two such pans are shown although any number may be used, one above the other, adjacent pans being inclined in opposite directions so that the material will flow from end to end of the pans. All the pans would be of identical construction.

Each end casting 10 is pivotally connected to the uprights 1, while the end castings 11 are slidably mounted in guides 11a on the uprights 1, the castings 11 being adjustably maintained in position by means of a bolt 11b on the casting engaging a slot in a lever 11c, one end of which is pivoted as at 11d to one upright, while the other end is provided with a tooth for engaging a notched guide 11e secured to another upright. By adjusting lever 11c, the castings 11 can be raised or lowered as required to adjust the inclination of the pans A and B to suit the particular kind of seed being cleaned.

Plates 12 extending between the pan end castings 10—11 receive the refuse and culls discharged over the tops of the belts (hereinafter described) and carry the refuse and culls down to the rotary brushes 13 which are housed in substantially semi-cylindrical recesses 12a disposed at the lower ends of the pans at opposite sides of the axes thereof, which brushes 13 move the refuse and culls down to the refuse discharge outlets 46—47.

The seed cleaning mechanism includes pairs of endless belt units arranged to form V-shaped belt troughs disposed in the pans A and B, said units having a close contact at their lower ends so as to prevent the seeds from falling through between them, and the belts of each unit running in opposite diagonally upward directions, as shown by the arrows.

Each unit consists of a frame member 14 (Figs. 5, 6, 7) preferably of channel shape, in each end of which is secured a casting 15 carrying fixed arms 16 extending through and beyond one flange of the frame 14, said arms carrying bearings 16a on their outer ends receiving the stub shafts 17a of the drive roll 17 of the unit. The initial settings of the arms 16 are maintained by spaced nuts 16n on the threaded ends of the arms engaging between them portions of the castings 15. At the center of frame member 14 is a casting 15a carrying in a similar manner an arm 16x carrying a bearing 16y for a reduced portion of drive roll 17, to prevent sagging of the roll.

The idler roll 18 at the opposite side of frame member 14 is adjustably mounted therein, the castings 15—15a carrying arms 19—19x respectively slidably mounted in bores in the members. Arms 19 carry bearings 19a for the stub shafts 18a of idler roll 18, while arm 19x carries a bearing 19y for a reduced portion of roll 18.

Preferably the rolls 17 and 17 are made in two sections, one roll of each pair of sections carrying an axial extension of reduced diameter adapted to fit within the bearings 16y and 19y (Fig. 5) and said extensions having non-circular sockets in their ends receiving non-circular lugs on the ends of the related sections, as indicated in Fig. 5. If desired the center member 15a and its associated wedge 20 and arm 19x may be omitted and the rolls 17 and 18 made in single sections.

Arms 19—19x are both singly and collectively adjustable to shift the idler roll 18 towards or from the drive roll 17. The inner end of each arm 19—19x is disposed in a recess 15r in the castings 15—15a housing a wedge 20 slidably mounted in the recess and contacting with the end of the arm 19—19x. Each wedge 20 is connected with an operating rod 21 terminating adjacent one end member 15. A T-shaped bar 22 is slidably mounted in the casting 15 with its head 22a (Figs. 5 and 8) overlying the ends of the rods 21, while the shank of the bar 22 is slidably mounted between slotted guides 23 (Fig. 5) in the member 14. A bolt 22c is threaded through the head 22a and abuts against a fixed lug 15p (Figs. 5 and 8) on member 15, whereby as bolt 22c is rotated in one direction the T-bar 22 will be drawn axially of the channel 14. Bolts 21a (Figs. 5 and 8) are threaded through the head 22a of bar 22 and enter tapped bores in the ends of the operating rods 21 respectively. Thus by adjusting the individual bolts 21a the individual wedges 20 may be singly moved to shift their related arms 19—19x inwardly or outwardly. By adjusting the single bolt 22c all of the wedges 20 will be shifted collectively.

An endless fabric or canvas belt 24 extends around the rolls 17—18 of each unit, and the belt is maintained stretched and prevented from creeping axially of the unit by means of a series of hooks 24a (Figs. 5, 6, 7) on the under sides of the belts at their ends slidably engaging endless stationary tracks 24b carried by the castings 15, said tracks being disposed within the ends of the belts 24 and conforming with the runs of the belts and with the arcs of the rolls 17—18 contacted by the belts. The hooks 24a maintain a constant lateral tension on the belt at all times to keep same taut and to insure smooth and even flow of seed from the upper to the lower end of the belt trough, also to prevent the flimsy belt from creeping inwardly from the ends of the rolls 17—18.

The belts 24 are driven by positive rotation of the rolls 17 which rolls, when the units are inserted in the pans A and B, are disposed lowermost with the rolls 17 of the units of each trough being disposed closely adjacent. The rolls 18 at the upper ends of the assembled units turn freely as the belts 24 travel over them.

One of the features of my machine is the provision for readily removing the belt units intact, to permit changing to a finer or coarser belt. To this end, each pan casting 10 is provided adjacent its apex with a pair of parallel shafts 26 (Figs. 5 and 7) extending through the castings at points substantially directly above the semi-cylindrical recesses 12a for brushes 13; said shafts 26 being housed in eccentric bushings. Intermeshing gears 26a (Fig. 7) on the outer ends of the pairs of shafts cause the shafts to rotate together but in opposite directions. The inner ends of shafts 26 carry double hex or other non-circular sockets 26b which receive the hex end 17h (Fig. 5) of the stub shaft 17a of the roll 17 of the related unit. The bearings for shafts 26 are eccentrically mounted in the casting 10, as at 26c, (Fig. 7) and is held in adjustment by a set screw whereby the shafts 26 may be adjusted slightly towards or from each other.

The opposite end of each roll 17 has a circular head 17k (Fig. 5) adapted to fit within an open eccentrically mounted bearing 30 located in the pan casting 11 in a position corresponding with the location of shaft 26 in casting 10. Eccentric open bearings 30 are held in adjusted positions by set screws so that the adjacent end of the shaft 17a of each belt unit which goes to form a belt trough may be adjusted towards or from the other shaft 17, for the purpose set forth.

By the above construction the belt units may be inserted in the troughs as units by first engaging the hex ends 17h of the shafts of rolls 17 in the hex-sockets 26a carried by pan castings 10, and then dropping the other ends 17k in the open bearings 30 carried by pan castings 11; and the belts 24 may be set approximately ten to twenty thousandths of an inch apart at their lower ends by adjusting the eccentric bearings 26c and 30 for the rolls 17, so that the nap will not be flattened while passing between the said rolls.

The angle between the units of each belt trough may be adjusted as required by operating shafts 35 (Figs. 2 and 4) mounted in pan castings 10, each shaft having a hand-wheel 35a at one end. Shafts 35 have right and left threaded portions at opposite sides and carry opposed arms 36, the upper ends of which are adapted to contact with projecting lugs 36a (Figs. 2 and 4) on the ends of castings 15 of the belt units thereby simultaneously tilting the upper ends of the belt units toward or from each other as shafts 35 are turned. The lower ends of adjusting arms 36 are slotted to engage bars 37 (Figs. 2 and 4) secured to castings 10, which bars prevent the arms 36 from rotating as shafts 35 are rotated.

Each belt 24 has its individual brush 13 which rotates in the same direction of movement of its belt but at a little faster speed to provide a pronounced brushing effect on the nap of the belt to raise same into position to pick up refuse, weed seeds, and culls as it travels upwardly and outwardly through the seeds in the belt trough. The belts are set about ten to twenty thousandths of an inch apart so that the nap will not be flattened after it leaves the brushes. The brushes 13 also convey the refuse and culls to the refuse outlet 46 (hereinafter described) by reason of their spiral construction, and are disposed within the semi-cylindrical recesses 12a of the pans A and B, one brush of each pan being twisted right and the other left on their shafts 13a in order to move or convey the refuse and culls to the ends of the troughs, since the brushes rotate in opposite direction. The end of the shaft of each brush 13 adjacent casting 10 is provided with a hex or other non-circular head 13b (Fig. 5) adapted to fit a corresponding double hex or other non-circular socket 41 on the inner end of a stub shaft 42 (Fig. 5) journaled in the casting 10 with its outer end extending through the casting and carrying a gear 43 thereon meshing with its related gear 26a (Fig. 7) of the drive for roll 17 which is disposed immediately above same. Preferably the sizes of the non-circular heads and sockets of the brushes are different for the rights and lefts to prevent misarrangement of the brushes in the troughs. The lower end of each brush shaft 13a is provided with a thrust collar 44 (Fig. 5) which also holds the wires of the brush clamped to the shaft to prevent un-twisting. Collars 44 abut against removable closure plates 45 covering the openings 11x through the castings 11 through which the brushes are passed in assemblying. The brushes 13 are not journaled in the recesses 12a but merely float therein on their bristles, and are revolved by the non-circular heads 13b engaged in the sockets 41 described above. The brushes 13 extend the entire length of the pans A and B and engage the under sides of the belts 24 and convey the refuse and culls to the end of the pans where same from upper pan A will be discharged through spout 46 into a flexible tube 47 to which collecting bags (not shown) or the like may be attached. From the lower pan B the refuse and culls may be discharged through a similar spout 46 into bags, or discharged directly into a feed hopper 48 of the elevating mechanism hereinafter described. The clean seed in the upper pan A makes its way down along the upper belt trough, and passes over the lower end of the trough and drops into the next lower belt trough through a spout 49 disposed between the brushes 13.

Spout 49 (Figs. 5 and 6) is provided with upwardly and outwardly diverging sides 49a adapted to rest upon the pan plates 12, the sides 49a overlying the cylindrical recesses 12a housing brushes 13 which are reduced in diameter, as at 13p (Fig. 6) under the sides 49a. The main body of the spout 49 is passed down through a correspondingly shaped slot 13d (Figs. 5 and 6) in the plates 12a, which slot is of size and shape to snugly receive the spout, so that the refuse and culls may be passed by brushes 13 under the sides 49a while the clean seed which is discharged over the lower end of the belt trough will drop directly into the upper flared end of spout 49 and into the top of the next lower belt trough. The discharge of cleaned seed from the lowermost belt trough is through a similar spout 49 directly into a hopper 50 from whence the cleaned seed may be removed.

Elevating means (Fig. 2) are associated with the feed hopper 48. Said hopper has a seed receiving tubular portion 48a at its lower end, and a split endless tube 51 has its ends threaded into the ends of portion 48a. An endless bucket chain 52 is housed in said tube which latter has a portion overlying the upper end of the uppermost belt trough, in which portion is disposed a discharge spout casting 53 through which the seed, raised by the bucket chain 52 moving in the direction of the arrow (Fig. 2) is emptied. A valve is provided in the discharge spout 53 consisting of a sleeve 53a having a port adapted to register with the spout, and having a handle 53b (Fig. 1) whereby when the sleeve is rotated to register with the spout a regulated amount of seeds to be cleaned may drop therethrough. Bucket chain 52 is driven by a notched rotatable drive wheel 55 in an enlarged housing portion 56 of the tube, the notches of the member 55 engaging the buckets and moving the chain in the tube 51 as the member rotates. Member 55 is mounted on a shaft 57 journaled in the housing 56 and driven as hereinafter described. A by-pass 56a (Fig. 2) is provided in the housing having an inclined wall 56b leading from the top of the housing 56 to the throat of the by-pass 56a, down which the seed carried over by the bucket chain beyond the spout 53 is passed, to prevent crushing of the seed between the bucket chain and the lower end of the housing 56, the by-pass 56a returning the seed directly to hopper 48 through a pipe 56x, thus as the buckets pass the adjustable sleeve 53a only the amount of seed required for operating the machine is dropped through spout 53 into the upper belt trough, and the balance passes the spout, and drops down the inclined wall 56b and is by-passed into the hopper 48 as described.

The drive of the machine is as follows:— Mounted on one upright 1 is an electric motor 4 above which is a drive shaft 5 carrying a pulley wheel 6 driven by a belt 7 from a pulley 4a on the shaft of motor 4. The bearing 5a of shaft 5 is pivotally mounted on a plate 8 attached to upright 1, and a screw rod 9 carrying a handwheel 9a is journaled at one end in an ear on plate 8 while the threaded end engages a tapped bore in bearing 5a whereby as handwheel 9a is rotated the shaft 5 will be moved towards or from the shaft of motor 4 to tighten or loosen belt 7. On shaft 5 is a sprocket 5x (Fig. 3) while on the shaft 26 of one roll 17 of the upper belt trough is a large sprocket 60, and a chain 61 runs around the sprockets 5x and 60 to directly drive the rolls 17 and brushes 13 of the upper trough and pan. A counter shaft 62 is journaled on the uprights 1 extending the length of the frame, said shaft having a sprocket 63 on one end opposite a sprocket 64 (Fig. 5) of same size (beside sprocket 60) on shaft 26. A chain 65 runs around sprockets 63 and 64 to rotate shafts 26 and 62 in unison. At the other end of shaft 62 is a sprocket 66 (Fig. 4) and on one shaft 26 of the lower belt trough is a sprocket 67 of same size. A chain 68 runs over said sprockets 66, 67 to drive the rolls 17 and brushes 13 of the lower trough and pan. On the shaft 26 of the upper trough, beside sprocket 64 is a third sprocket 69 (Fig. 5), and a sprocket 70 is mounted on the shaft 57 of the bucket chain driving wheel 55; and a chain 71 runs over the sprockets 69 and 70.

I do not limit my invention to the exact details shown, for obviously changes may be made therein within the scope of the claims.

I claim:—

1. A cleaning machine of the character specified comprising a frame, an inclined V-shaped pan in the frame having a pair of semi-cylindrical recesses therein adjacent the axis thereof and extending the full length of the pan; rotary conveyor brushes in said recesses; an opposed pair of laterally inclined endless fabric belt units forming a V-shaped belt trough journaled in the pan with their lower ends closely adjacent and contacting with the brushes; means for simultaneously moving the belts so that their upper runs move upwardly and outwardly to discharge refuse over the tops of the units into the pan; means for rotating the brushes to raise the nap on the belts and to carry the refuse to the lower end of the pan; means for discharging the refuse from the pan; and means for collecting the cleaned material at the lower end of the trough.

2. In combination with a machine as set forth in claim 1, means for adjusting the inclination of the pan.

3. In combination with a machine as set forth in claim 1, means for adjusting the angularity between the units of the trough.

4. In combination with a machine as set forth in claim 1; means for adjusting the distance between the lower ends of the units.

5. In a machine as set forth in claim 1, each unit comprising a frame; a shaft journaled at one side thereof; arms slidably mounted at the opposite side thereof; a second shaft journaled in said arms; the endless belts running over said shafts; means for individually adjusting said arms; and means for collectively adjusting the arms.

6. In a machine as set forth in claim 1, each unit comprising a frame; parallel shafts journaled in said frame; the endless belt running over said shafts; means for adjusting the distance between the shafts; endless tracks carried by the frame within the ends of the belt; and members on the ends of the belt slidably engaging the track to maintain the belt taut.

7. In a machine as set forth in claim 1; said units including drive rolls around which the lower ends of the belts run, said rolls each having a non-circular end and a circular end; a pair of stub shafts rotated by the belt moving means, and journaled in one end of the pan opposite the rolls, said stub shafts having non-circular sockets receiving the non-circular ends of their respective rolls; and a pair of open bearings in the other end of the pan receiving the circular ends of the rolls, whereby the units are readily insertable in and removable from the machine.

8. In a machine as set forth in claim 1; said units including drive rolls around which the lower ends of the belts run, said rolls each having a non-circular end and a circular end; a pair of stub shafts rotated by the belt moving means and journaled in one end of the pan opposite the rolls, said stub shafts having non-circular sockets receiving the non-circular ends of their respective rolls; a pair of open bearings in the other end of the pan receiving the circular ends of the rolls whereby the units are readily removable from the machine; and means for adjusting said stub shafts and open bearings to vary the distance between the drive rolls of the units to prevent flattening of the nap of the belts when passing therebetween.

9. In a machine as set forth in claim 1, a pair of stub shafts rotated by the brush rotating means and disposed at one end of the pan opposite the ends of the brushes, said shafts having non-circular sockets; said brushes having non-circular ends adapted to enter said sockets; said pan having openings in the other end aligned with the recesses through which the brushes are inserted into the pan; thrust bearing members on the adjacent ends of the brushes; and removable closure members for said openings against which the thrust bearings abut; the brushes floating in the recesses on their said bristles.

10. In a machine as set forth in claim 1, said collecting means comprising a spout extending downwardly through the pan between the brushes at the lower end of the belt trough; the upper ends of the sides of the spout flaring outwardly and upwardly and resting upon the pan; and the brushes in way of the spout being reduced in diameter.

11. In combination with a machine as set forth in claim 1; a feed hopper below the pan; an endless conduit communicating with and extending through the hopper and overlying the upper end of the trough; means in said conduit for moving material; a discharge spout in the conduit over the trough; and means for regulating the amount of material discharged therefrom.

12. In a seed cleaning machine, a frame, inclined V-shaped pans mounted in the frame one above the other, adjacent pans being inclined in the opposite directions; each pan having a pair of semi-cylindrical recesses therein adjacent the axis thereof extending the full length of the pan; rotary conveyor brushes in said recesses; opposed pairs of transversely inclined endless fabric belt units forming V-shaped belt troughs journaled in the pans with their lower ends closely adjacent and contacting with the brushes; means for simultaneously moving the belts so that their upper runs move upwardly and outwardly to discharge refuse over the tops of the units into the pans; means for rotating the brushes to raise the nap on the belts and to carry the refuse to the lower ends of the pans; means for discharging the refuse from the pans; and means at the lower end of the upper troughs for transferring the cleaned material into the upper end of a next lower trough; and means for collecting the cleaned material at the lower end of the lowermost trough.

13. In combination with a machine as set forth in claim 12; a feed hopper below the pans; an endless conduit communicating with and extending through the hopper and overlying the upper end of the uppermost trough; means in said conduit for moving material; a discharge spout in the conduit over the upper trough; means for regulating the amount of material discharged therefrom; and a by-pass from the conduit beyond the spout leading to the hopper.

14. In combination with a machine as set forth in claim 12; a feed hopper below the pans; an endless conduit communicating with and extending through the hopper and overlying the upper end of the uppermost trough; a bucket chain in said conduit for moving material; a discharge spout in the conduit over the upper trough; a ported sleeve in the spout for regulating the amount of material discharged therefrom; means for driving the bucket chain; and a by-pass around the driving means leading back to the hopper.

15. In a machine of the character specified; a main frame having opposed pairs of adjacent bearings; a pair of opposed endless belt units each comprising a belt frame, sets of opposed arms slidably mounted in the belt frame, parallel shafts journaled in the opposed arms, and endless belts running over the shafts; said units being supported in the main frame with one shaft journaled in the pairs of bearings to form a V-shaped belt trough with the runs of the belts of the units substantially touching at their lower ends; means for moving the upper runs of the belts of the units upwardly at the same speed; and means for adjusting the distance between the belt frame shafts comprising rods extending through each belt frame, wedge members on said rods engaging the inner ends of arms in each set, means in the belt frame for fixing one arm of each set, and means for simultaneously shifting the rods to adjust the arms of each set.

16. In a seed cleaning machine, a frame, an inclined V-shaped pan mounted in the frame having a pair of semi-cymlindrical recesses therein adjacent the axis thereof extending the full length of the pan; rotary conveyor brushes in said recesses; an opposed pair of laterally inclined endless fabric belt units forming a V-shaped belt trough journaled in the pan with their lower ends closely adjacent and contacting with the brushes; means for simultaneously moving the belts so that their inner runs move upwardly and outwardly; means for rotating the brushes; a pair of stub shafts rotated by the brush rotating means and disposed at one end of the pan opposite the ends of the brushes, said shafts having non-circular sockets; said brushes having non-circular ends adapted to enter said sockets; said pan having openings in the other end aligned with the recesses through which the brushes are inserted into the pan; thrust bearing members on the adjacent ends of the brushes; and removable closure members for said openings against which the thrust bearings abut; the brushes floating in the recesses on their said bristles.

17. In a seed cleaning machine, a frame, an inclined V-shaped pan mounted in the frame having a pair of semi-cylindrical recesses therein adjacent the axis thereof extending the full length of the pan; rotary conveyor brushes in said recesses; an opposed pair of laterally inclined endless fabric belt units forming a V-shaped belt trough journaled in the pan with their lower ends closely adjacent and contacting with the brushes; means for simultaneously moving the belts so that their inner runs move upwardly and outwardly; means for rotating the brushes; and a spout extending downwardly through the pan between the brushes at the lower end of the belt trough, the upper ends of the sides of the spout flaring outwardly and upwardly and resting upon the pan, and the brushes in way of the spout being reduced in diameter.

18. In a seed cleaning machine, a frame, an inclined V-shaped pan mounted in the frame having a pair of semicylindrical recesses therein adjacent the axis thereof extending the full length of the pan; rotary conveyor brushes in said recesses; an opposed pair of laterally inclined endless fabric belt units forming a V-shaped belt trough journaled in the pan with their lower ends closely adjacent and contacting with the brushes; means for simultaneously moving the belts so that their inner runs move upwardly and outwardly; means for rotating the brushes; and means for adjusting the distance between the lower ends of the units of each pan to prevent flattening of the nap of the belts.

JOHN F. FIELD.